(12) United States Patent
Derhaeg

(10) Patent No.: US 7,432,658 B2
(45) Date of Patent: Oct. 7, 2008

(54) METAL HALIDE DISCHARGE LAMP

(75) Inventor: Lode Derhaeg, Diest (BE)

(73) Assignee: Flowil International Lighting (Holding) B.V. (NL)

( * ) Notice: Subject to any disclaimer, the term of this patent is extended or adjusted under 35 U.S.C. 154(b) by 325 days.

(21) Appl. No.: 10/546,359

(22) PCT Filed: Feb. 19, 2004

(86) PCT No.: PCT/EP2004/001592

§ 371 (c)(1),
(2), (4) Date: Jun. 12, 2006

(87) PCT Pub. No.: WO2004/075229

PCT Pub. Date: Sep. 2, 2004

(65) Prior Publication Data
US 2007/0013314 A1    Jan. 18, 2007

(30) Foreign Application Priority Data
Feb. 19, 2003    (DE) .................. 103 07 067

(51) Int. Cl.
*H01J 61/44* (2006.01)
*H01J 61/12* (2006.01)

(52) U.S. Cl. .......... 313/638; 313/640; 313/570
(58) Field of Classification Search .......... None
See application file for complete search history.

(56) References Cited

U.S. PATENT DOCUMENTS

| 4,992,700 A | 2/1991 | Lake |
| 5,028,509 A * | 7/1991 | Shimada et al. ......... 430/139 |
| 5,965,984 A | 10/1999 | Horiuchi et al. |

FOREIGN PATENT DOCUMENTS

| DE | 200 04 732 U1 | 6/2000 |
| DE | 101 01 508 A1 | 8/2002 |

* cited by examiner

*Primary Examiner*—Ashok Patel
(74) *Attorney, Agent, or Firm*—Brooks Kushman P.C.

(57) ABSTRACT

In a metal halide vapor lamp, particularly for application in aquaria, having a fill containing $GdBr_3$, $HoJ_3$, $DyJ_3$, CsJ and TlJ, the fill additionally contains InJ, whereby all the said ingredients are mixed with each other in such a ratio that on the CIE chromaticity diagram the color point of the lamp having the coordinates X=0.265 and Y=0.265 deviates in no direction for more than 7 SDMC.

8 Claims, 1 Drawing Sheet

METAL HALIDE DISCHARGE LAMP

BACKGROUND OF THE INVENTION

1. Field of the Invention

The invention concerns a metal halide vapor lamp, particularly for application in aquaria, with a fill containing $GdBr_3$, $HoJ_3$, $DyJ_3$, $CsJ$ and $TlJ$.

2. Background Art

A metal halide vapor lamp of this kind is on the market place under the mark SLI Aqua Arc which contains 27.8% of weight $GdBr_3$, 22.2% of weight $HoJ_3$, 29.6% of weight $DyJ_3$, 13.0% of weight $CsJ$ and 7.4% of weight $TlJ$. This known metal halide vapor lamp has a CCT (Correlated Color Temperature) of 9300 K (i.e. a color correlation temperature equal to the temperature of 9300 K of a black body), a color point having the coordinates $X=0.277$ and $Y=0.312$, an efficiency of 60 lm/W and a CRI (Color Rendering Index) of 80.

Notwithstanding that with this lamp the luminous efficiency can be called particularly well, the color temperature could be higher and also the color rendering could be a bit better. The said coordinates X and Y lie in the green region of the CIE chromaticity diagram, whereby the colors of the objects illuminated, particularly of an aquarium, appear not that natural.

Besides from U.S. Pat. No. 4,992,700, a Three-Lines-Lamp (red-green-blue) is known having a fill from Indium, Zink, Lithium and Thallium which finds application in reprographic purposes and in the field of projection.

U.S. Pat. No. 5,965,984 describes a metal halide lamp for use as a light source for a LCD-Projector or the like which has a light transmitting container with a fill which consists of a starting gas which is an inert gas, of a least one halide of indium and of a halide of a rare earth metal, the latter being selected from the group consisting of Terbium, Dysprosium, Holmium, Erbium, Thulium and from mixtures from the same group.

Further, a high pressure discharge lamp can be taken from DE 101 01 508 A1 which can be used particularly in headlamps of power driven vehicles and which contains a fill from mercury, an inert gas and a metal halide mixture from at least one halide, whereby at least one part Indiumjodide or Thalliumjodide is contained in the metal halide mixture, which should influence the color point of the light radiation generated and should increase the quantity of light, for example, so the blue or yellow portion in the spectrum of the discharge could be increased.

Finally the DE 200 04 732 U1 teaches a low pressure gas discharge lamp for illumination of aquaria having a fill from a rare gas or a rare gas mixture and mercury, in which the UV-radiation of the mercury discharge is transformed by a specific fluorescent into the desired blue radiation. A disadvantage of this lamp consists in the low radiation density which is sufficient to illuminate an aquarium in its upper region only.

The object underlying the invention is seen in providing a metal halide vapor lamp of the kind mentioned initially of which the color temperature on the one hand and the color rendering index on the other hand are higher and which particularly makes the colors of the objects irradiated appearing especially natural.

SUMMARY OF THE INVENTION

This object is met with a metal halide vapor lamp of the structure mentioned initially in that the fill additionally contains $InJ$ and that all the said ingredients are mixed with each other in such a ratio that on the CIE chromaticity diagram the color point of the lamp having the coordinates $X=0.265$ and $Y=0.265$ deviates in no direction for more than 7 SDMC.

DETAILED DESCRIPTION OF THE PREFERRED EMBODIMENT(S)

Figure 1:
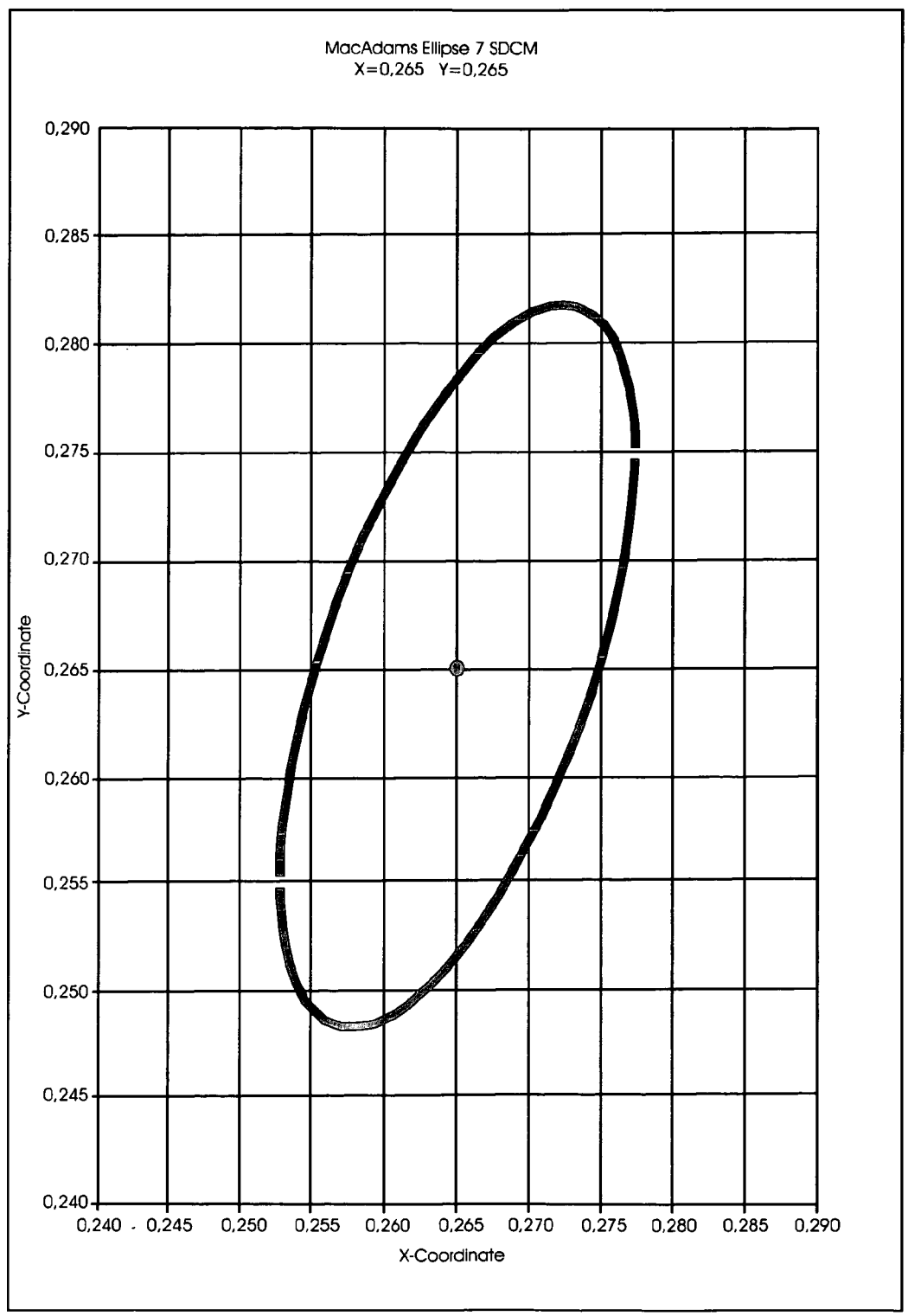
FIG. 1 is a graph depiction of the ellipse around a color point with respect to several SDCM.

Under SDCM the standard deviation of color matching is understood, in the FIGURE indicated by SDCM also.

In the attached FIGURE the ellipse around the color point having the coordinates $X=0.265$ and $Y=0.265$ is depicted which results with respect to seven SDCM. Ellipses of the kind shown are called MacAdam-Ellipses.

The point possessing the said coordinates lies in the blue region, thereby the colors of the objects illuminated appear particularly natural. Besides in accordance with the invention a color temperature between 12,000 and 16,000 K is attainable, as well as a color rendering index (CRI) of 90 and more.

Advantageously in accordance with the invention the fill can contain 19 to 24% of weight $GdBr_3$, 17 to 22% of weight $HoJ_3$, 14 to 18% of weight $DyJ_3$, 27 to 37% of weight $CsJ$, 1.6 to 3.2% of weight $TlJ$ and 6 to 10% of weight $InJ$.

According to a particularly preferred embodiment the fill contains 21.7% of weight $GdBr_3$, 19.6% of weight $HoJ_3$, 16.4% of weight $DyJ_3$, 32% of weight $CsJ$, 2.4% of weight $TlJ$ and 7.9% of weight $InJ$. Thereby a CCT of 14,000 K results, an efficiency in lm/W of 50 and a CRI of 90. Notwithstanding that in comparison with the said prior art a certain reduction of efficiency had to be accepted, nevertheless the advantages as described are preponderant by far because the appearance of the illuminated objects is particularly natural.

The lamp can be used e.g. advantageously for the illumination of an aquarium either from outside or from inside. In the latter case as a so-called subaqueous illumination. The luminaire used thereby is a matter of design.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A metal halide vapor lamp having a fill containing $GdBr_3$, $HoJ_3$, $DyJ_3$, $CsJ$ and $TlJ$, wherein the fill additionally contains $InJ$ with all the said ingredients being mixed with each other in such a ratio that on the CIE chromaticity diagram the color point of the lamp having the coordinates $X=0.265$ and $Y=0.265$ deviates in no direction for more than 7 SDMC.

2. The metal halide vapor lamp according to claim 1, wherein the fill contains 19 to 24% of weight $GdBr_3$, 17 to 22% of weight $HoJ_3$, 14 to 18% of weight $DyJ_3$, 27 to 37% of weight $CsJ$, 1.6 to 3.2% of weight $TlJ$ and 6 to 10% of weight $InJ$.

3. The metal halide vapor lamp according to claim 2, wherein the fill contains 21.7% of weight $GdBr_3$, 19.6% of weight $HoJ_3$, 16.4% of weight $DyJ_3$, 32% of weight $CsJ$, 2.4% of weight $TlJ$ and 7.9% of weight $InJ$.

4. The metal halide vapor lamp of claim 1, wherein the lamp is usable in an aquarium.

5. A metal halide vapor lamp having a fill comprising $GdBr_3$, $HoJ_3$, $DyJ_3$, CsJ, TlJ, and InJ, with all of the ingredients being mixed with each other in such a ratio that on the CIE chromaticity diagram the color point of the lamp having the coordinates X=0.265 and Y=0.265 does not deviate in any direction for more than 7 SDMC.

6. The metal halide vapor lamp according to claim 1, wherein the $GdBr_3$ is present in an amount of 19 to 24% by weight, the $HoJ_3$ is present in an amount of 17 to 22% by weight, the $DyJ_3$ is present in an amount of 14 to 18% by weight, the CsJ is present in an amount of 27 to 37% by weight, the TlJ is present in an amount of 1.6 to 3.2% by weight and the InJ is present in an amount of 6 to 10% by weight.

7. The metal halide vapor lamp according to claim 2, wherein the fill comprises 21.7% of weight $GdBr_3$, 19.6% of weight $HoJ_3$, 16.4% of weight $DyJ_3$, 32% of weight CsJ, 2.4% of weight TlJ and 7.9% of weight InJ.

8. An aquarium having an aquarium housing supporting the lamp of claim 1.

* * * * *